(12) United States Patent
Bhave et al.

(10) Patent No.: US 10,587,333 B2
(45) Date of Patent: Mar. 10, 2020

(54) FORWARD LINK POWER CONTROL

(71) Applicant: Inmarsat Global Limited, London (GB)

(72) Inventors: Paven Bhave, London (GB); Patrick Sharkey, London (GB); David Bath, London (GB); Richard Locke, London (GB)

(73) Assignee: Inmarsat Global Limited, London (GB)

( * ) Notice: Subject to any disclaimer, the term of this patent is extended or adjusted under 35 U.S.C. 154(b) by 0 days.

(21) Appl. No.: 15/840,400

(22) Filed: Dec. 13, 2017

(65) Prior Publication Data

US 2018/0167135 A1   Jun. 14, 2018

(30) Foreign Application Priority Data

Dec. 13, 2016 (GB) .................................. 1621173.2

(51) Int. Cl.
*H04B 7/185* (2006.01)
*H04L 1/00* (2006.01)
*H04W 52/18* (2009.01)
*H04W 52/42* (2009.01)
*H04W 52/34* (2009.01)

(52) U.S. Cl.
CPC ..... *H04B 7/18519* (2013.01); *H04B 7/18513* (2013.01); *H04L 1/0003* (2013.01); *H04L 1/0009* (2013.01); *H04L 1/0015* (2013.01); *H04W 52/18* (2013.01); *H04W 52/346* (2013.01); *H04W 52/42* (2013.01)

(58) Field of Classification Search
CPC ............ H04B 7/18519; H04B 7/18513; H04B 7/2041; H04B 7/18539; H04L 1/0003; H04L 1/0009; H04L 1/0015; H04W 52/15; H04W 52/346; H04W 52/42
See application file for complete search history.

(56) References Cited

U.S. PATENT DOCUMENTS

| 4,119,964 A | 10/1978 | Johannsen et al. |
| 4,228,538 A | 10/1980 | Scharla-Nielsen et al. |
| 4,261,054 A | 4/1981 | Scharla-Nielsen |

(Continued)

FOREIGN PATENT DOCUMENTS

| CN | 104581918 A | 4/2015 |
| DE | 3824338 A1 | 12/1992 |

(Continued)

OTHER PUBLICATIONS

Combined Search and Examination Report for GB1621173.2, dated Dec. 13, 2016, 3 pages.

(Continued)

*Primary Examiner* — Kibrom T Hailu
(74) *Attorney, Agent, or Firm* — Sterne, Kessler, Goldstein & Fox P.L.L.C.

(57) ABSTRACT

A method of forward link power control in a communications system comprises: grouping a plurality of user terminals into a plurality of groups, at least one of which comprises more than one of the user terminals; for each said group, determining a corresponding forward link power level required to satisfy an aggregate demand of the group; and assigning one or more forward link carriers to the group, with the corresponding power level.

18 Claims, 4 Drawing Sheets

(56) References Cited

U.S. PATENT DOCUMENTS

| | | |
|---|---|---|
| 4,567,485 A | 1/1986 | Oshima et al. |
| 4,691,882 A | 9/1987 | Young |
| 4,731,866 A | 3/1988 | Muratani et al. |
| 4,905,235 A | 2/1990 | Saburi |
| 4,910,792 A | 3/1990 | Takahata et al. |
| 4,941,199 A | 7/1990 | Saam |
| 5,073,900 A | 12/1991 | Mallinckrodt |
| 5,257,019 A | 10/1993 | Schwendeman et al. |
| 5,257,029 A | 10/1993 | Miyo |
| 5,285,208 A | 2/1994 | Bertiger et al. |
| 5,339,330 A | 8/1994 | Mallinckrodt |
| 5,446,756 A | 8/1995 | Mallinckrodt |
| 5,612,703 A | 3/1997 | Mallinckrodt |
| 5,619,525 A | 4/1997 | Wiedeman et al. |
| 5,678,175 A | 10/1997 | Stuart et al. |
| 5,697,056 A | 12/1997 | Tayloe |
| 5,710,982 A | 1/1998 | Laborde et al. |
| 5,754,942 A | 5/1998 | Wachs |
| 5,765,098 A | 6/1998 | Bella |
| 5,790,940 A | 8/1998 | Laborde et al. |
| 5,828,947 A | 10/1998 | Michel et al. |
| 5,832,379 A | 11/1998 | Mallinckrodt |
| 5,835,846 A | 11/1998 | Furukawa et al. |
| 5,835,847 A | 11/1998 | Gilmore et al. |
| 5,835,857 A | 11/1998 | Otten |
| 5,864,547 A | 1/1999 | Strodtbeck et al. |
| 5,878,329 A | 3/1999 | Mallinckrodt |
| 5,924,015 A * | 7/1999 | Garrison ............ H04B 7/18543 |
| | | 455/13.4 |
| 5,940,753 A | 8/1999 | Mallinckrodt |
| 5,951,709 A | 9/1999 | Tanaka |
| 5,956,619 A | 9/1999 | Gallagher et al. |
| 5,963,862 A * | 10/1999 | Adiwoso ............ H04B 7/1853 |
| | | 455/12.1 |
| 5,978,363 A | 11/1999 | Dimitrijevic et al. |
| 5,995,832 A | 11/1999 | Mallinckrodt |
| 6,021,309 A | 2/2000 | Sherman et al. |
| 6,081,710 A | 6/2000 | Sherman et al. |
| 6,085,067 A | 7/2000 | Gallagher et al. |
| 6,091,933 A | 7/2000 | Sherman et al. |
| 6,097,752 A | 8/2000 | Wiedeman et al. |
| 6,108,561 A | 8/2000 | Mallinckrodt |
| 6,157,811 A | 12/2000 | Dent |
| 6,163,679 A | 12/2000 | Bakke et al. |
| 6,219,528 B1 | 4/2001 | Wright et al. |
| 6,240,124 B1 | 5/2001 | Wiedeman et al. |
| 6,272,325 B1 | 8/2001 | Wiedeman et al. |
| 6,317,585 B1 | 11/2001 | Shibasaki |
| 6,321,065 B1 | 11/2001 | Wilcoxson et al. |
| 6,328,264 B1 | 12/2001 | Maeda et al. |
| 6,352,222 B1 | 3/2002 | Maeda et al. |
| 6,422,516 B1 | 7/2002 | Maeda et al. |
| 6,430,418 B1 | 8/2002 | Nivens et al. |
| 6,477,355 B1 | 11/2002 | Grayson et al. |
| 6,490,448 B1 | 12/2002 | Hogberg et al. |
| 6,499,698 B2 | 12/2002 | Maeda et al. |
| 6,615,052 B1 | 9/2003 | Parmenter |
| 6,628,920 B1 * | 9/2003 | Wolcott ............ H04B 7/18539 |
| | | 370/316 |
| 6,634,602 B2 | 10/2003 | Maeda et al. |
| 6,684,057 B2 | 1/2004 | Karabinis |
| 6,711,398 B1 | 3/2004 | Talaie et al. |
| 6,760,566 B1 | 7/2004 | Wright et al. |
| 6,764,049 B1 | 7/2004 | Maeda et al. |
| 6,824,107 B2 | 11/2004 | Maeda et al. |
| 6,829,226 B1 | 12/2004 | Apostolides et al. |
| 6,839,540 B1 | 1/2005 | Katzur |
| 6,982,964 B2 | 1/2006 | Beering |
| 6,985,716 B2 | 1/2006 | Talaie et al. |
| 6,996,077 B1 | 2/2006 | Suenaga et al. |
| 7,043,199 B2 | 5/2006 | Dai et al. |
| 7,047,029 B1 | 5/2006 | Godwin et al. |
| 7,116,936 B2 | 10/2006 | Kim |
| 7,120,434 B2 | 10/2006 | Talaie et al. |
| 7,194,270 B2 * | 3/2007 | Smith ............ H04B 7/2041 |
| | | 455/12.1 |
| 7,254,117 B2 | 8/2007 | Choi et al. |
| 7,289,460 B1 | 10/2007 | Thacker et al. |
| 7,386,310 B2 | 6/2008 | Dai et al. |
| 7,450,602 B2 | 11/2008 | Vazquez Castro |
| 7,599,659 B2 | 10/2009 | Wang et al. |
| 7,633,895 B2 | 12/2009 | Schiff et al. |
| 7,639,981 B2 | 12/2009 | Karabinis |
| 7,715,788 B1 | 5/2010 | Lozano |
| 7,720,136 B2 | 5/2010 | Friedman et al. |
| 7,782,811 B2 | 8/2010 | Battista et al. |
| 7,783,287 B2 | 8/2010 | Karabinis |
| 7,929,482 B2 | 4/2011 | Tian et al. |
| 7,933,215 B2 | 4/2011 | Schiff et al. |
| 7,974,576 B2 | 7/2011 | Martin et al. |
| 8,010,043 B2 | 8/2011 | Miller |
| 8,068,827 B2 | 11/2011 | Miller et al. |
| 8,107,875 B2 | 1/2012 | Miller |
| 8,131,212 B2 | 3/2012 | Laufer |
| 8,144,643 B2 | 3/2012 | Miller et al. |
| 8,155,584 B2 | 4/2012 | Wang et al. |
| 8,179,778 B2 | 5/2012 | Kim et al. |
| 8,189,504 B2 | 5/2012 | Becker et al. |
| 8,195,090 B2 | 6/2012 | Treesh et al. |
| 8,213,929 B2 | 7/2012 | Miller et al. |
| 8,218,476 B2 | 7/2012 | Miller |
| 8,238,817 B1 | 8/2012 | Avellan et al. |
| 8,254,303 B2 | 8/2012 | Becker et al. |
| 8,254,832 B2 | 8/2012 | Dankberg et al. |
| 8,270,898 B2 | 9/2012 | Karabinis et al. |
| 8,285,202 B2 | 10/2012 | Miller |
| 8,300,571 B2 | 10/2012 | Becker et al. |
| 8,315,199 B2 | 11/2012 | Dankberg et al. |
| 8,320,296 B2 | 11/2012 | Becker et al. |
| 8,369,776 B2 | 2/2013 | Karabinis et al. |
| 8,374,118 B2 | 2/2013 | Becker et al. |
| 8,385,223 B2 | 2/2013 | Miller et al. |
| 8,401,038 B2 | 3/2013 | Becker et al. |
| 8,411,615 B2 | 4/2013 | Hong et al. |
| 8,428,000 B2 | 4/2013 | Battista et al. |
| 8,447,295 B2 | 5/2013 | Palmer et al. |
| 8,483,609 B2 | 7/2013 | Miller |
| 8,509,144 B2 | 8/2013 | Miller et al. |
| 8,538,323 B2 | 9/2013 | Dankberg et al. |
| 8,547,863 B2 | 10/2013 | Miller et al. |
| 8,548,337 B2 | 10/2013 | Taylor |
| 8,576,767 B2 | 11/2013 | Ravishankar et al. |
| 8,600,296 B2 | 12/2013 | Miller |
| 8,699,465 B2 | 4/2014 | Tian et al. |
| 8,712,321 B1 | 4/2014 | Dankberg |
| 8,726,133 B2 | 5/2014 | Hong et al. |
| 8,737,925 B2 | 5/2014 | Beeler et al. |
| 8,774,731 B2 | 7/2014 | Brown et al. |
| 8,792,821 B2 | 7/2014 | Treesh et al. |
| 8,804,857 B2 | 8/2014 | Kim et al. |
| 8,805,390 B2 | 8/2014 | Swardh et al. |
| 8,831,598 B1 | 9/2014 | Clemmensen et al. |
| 8,855,552 B2 | 10/2014 | Dankberg et al. |
| 8,879,982 B2 | 11/2014 | Jayasimha et al. |
| 8,891,434 B2 | 11/2014 | Becker et al. |
| 8,897,207 B2 | 11/2014 | Argov et al. |
| 8,897,769 B2 | 11/2014 | Miller et al. |
| 8,977,191 B2 | 3/2015 | Jong et al. |
| 9,009,338 B2 | 4/2015 | Dankberg |
| 9,009,762 B2 | 4/2015 | Kim et al. |
| 9,014,620 B2 | 4/2015 | Dankberg |
| 9,025,679 B2 | 5/2015 | Ryu et al. |
| 9,026,106 B2 | 5/2015 | Livergood |
| 9,036,661 B2 | 5/2015 | Becker et al. |
| 9,037,078 B2 | 5/2015 | Karabinis |
| 9,077,428 B2 | 7/2015 | Tronc |
| 9,086,471 B2 | 7/2015 | Mengwasser |
| 9,088,335 B2 | 7/2015 | Jong et al. |
| 9,124,342 B2 | 9/2015 | Beeler et al. |
| 9,172,457 B2 | 10/2015 | Dankberg et al. |
| 9,176,213 B2 | 11/2015 | Liu et al. |
| 9,184,829 B2 | 11/2015 | Miller et al. |
| 9,198,077 B2 | 11/2015 | Park |

(56) References Cited

U.S. PATENT DOCUMENTS

| | | | |
|---|---|---|---|
| 9,198,126 B2 | 11/2015 | Topping et al. | |
| 9,203,431 B2 | 12/2015 | Lee et al. | |
| 9,203,504 B2 | 12/2015 | Zakaria et al. | |
| 9,246,576 B2 | 1/2016 | Yanai et al. | |
| 9,300,391 B2 | 3/2016 | Ravishankar et al. | |
| 9,319,128 B2 | 4/2016 | Yamamoto et al. | |
| 9,356,685 B2 | 5/2016 | Angeletti et al. | |
| 9,357,508 B2 | 5/2016 | Elinav et al. | |
| 9,379,806 B1 | 6/2016 | Mandell et al. | |
| 9,391,690 B2 | 7/2016 | Jong et al. | |
| 9,485,010 B1 | 11/2016 | Chen et al. | |
| 9,496,946 B2 | 11/2016 | Battista et al. | |
| 10,110,300 B2 * | 10/2018 | Xu | H04B 7/18578 |
| 2002/0137457 A1 | 9/2002 | Nivens et al. | |
| 2003/0083089 A1 | 5/2003 | Malladi | |
| 2004/0033780 A1 | 2/2004 | Kelly | |
| 2004/0116134 A1 | 6/2004 | Maeda et al. | |
| 2005/0117610 A1 | 6/2005 | Chevallier et al. | |
| 2005/0288012 A1 | 12/2005 | Morgan | |
| 2008/0159419 A1 * | 7/2008 | Smith | H04B 7/18534 375/260 |
| 2012/0058797 A1 | 3/2012 | Peter et al. | |
| 2012/0120869 A1 | 5/2012 | Miller | |
| 2012/0282922 A1 * | 11/2012 | Fodor | H04W 8/22 455/426.1 |
| 2012/0294230 A1 | 11/2012 | Dankberg et al. | |
| 2013/0157560 A1 | 6/2013 | Blau et al. | |
| 2013/0222179 A1 | 8/2013 | Jeong | |
| 2013/0309961 A1 | 11/2013 | Lim et al. | |
| 2014/0056335 A1 | 2/2014 | Ryu et al. | |
| 2014/0064118 A1 | 3/2014 | Hong et al. | |
| 2014/0198721 A1 | 7/2014 | Walker et al. | |
| 2014/0199940 A1 | 7/2014 | Dockemeyer, Jr. et al. | |
| 2014/0211722 A1 * | 7/2014 | Pietraski | H04L 1/1812 370/329 |
| 2015/0031408 A1 * | 1/2015 | Kalla | H04W 52/38 455/522 |
| 2015/0139072 A1 | 5/2015 | Hong et al. | |
| 2015/0215029 A1 | 7/2015 | Lemme | |
| 2016/0072613 A1 * | 3/2016 | Esserman | H04L 5/0037 370/230 |
| 2016/0191145 A1 | 6/2016 | Fang et al. | |
| 2016/0195618 A1 | 7/2016 | Baer et al. | |
| 2016/0218796 A1 | 7/2016 | Ryu | |
| 2016/0242066 A1 | 8/2016 | Ryu | |
| 2016/0274240 A1 | 9/2016 | Wheatley | |
| 2016/0277096 A1 | 9/2016 | Ryu | |
| 2016/0278063 A1 | 9/2016 | Zhang et al. | |
| 2016/0308603 A1 | 10/2016 | Hirsch et al. | |

FOREIGN PATENT DOCUMENTS

| | | |
|---|---|---|
| DE | 3642213 C2 | 1/1994 |
| EP | 0416462 A2 | 3/1991 |
| EP | 0790715 A1 | 6/1997 |
| EP | 116866 A2 | 1/2002 |
| EP | 1168663 A2 | 1/2002 |
| EP | 1199828 A2 | 4/2002 |
| EP | 2073400 B1 | 12/2011 |
| EP | 2611043 A1 | 7/2013 |
| FR | 2745673 B1 | 4/1998 |
| GB | 2348339 B | 3/2001 |
| JP | H02-280424 A | 11/1990 |
| WO | WO 95/13671 A1 | 5/1995 |
| WO | WO 01/05063 A1 | 1/2001 |
| WO | WO 02/21725 A1 | 3/2002 |
| WO | WO 02/078216 A1 | 10/2002 |
| WO | WO 2004/057777 A2 | 7/2004 |
| WO | WO 2004/100501 A2 | 11/2004 |
| WO | WO 2007/021155 A1 | 2/2007 |
| WO | WO 2007/071059 A1 | 6/2007 |
| WO | WO 2007/082719 A1 | 7/2007 |
| WO | WO 2009/078539 A1 | 6/2009 |
| WO | WO 2010/054394 A2 | 5/2010 |
| WO | WO 2010/097349 A2 | 9/2010 |
| WO | WO 2014/084464 A1 | 6/2014 |

OTHER PUBLICATIONS

European Search Report directed to European Patent Application No. EP 17 20 6824, completed May 3, 2018, 2 pages.

* cited by examiner

FORWARD LINK POWER CONTROL

FIELD OF THE INVENTION

The present invention relates to a method and apparatus for power control in a forward link of a communication system, particularly but not exclusively a satellite communications system.

BACKGROUND OF THE INVENTION

Many satellite communications systems have Adaptive Coding and Modulation (ACM) that aim to maximize the throughput of a forward link (i.e. for transmission to a user terminal (UT)). An example system is disclosed in US2014/0056335 A1.

Figure 1:
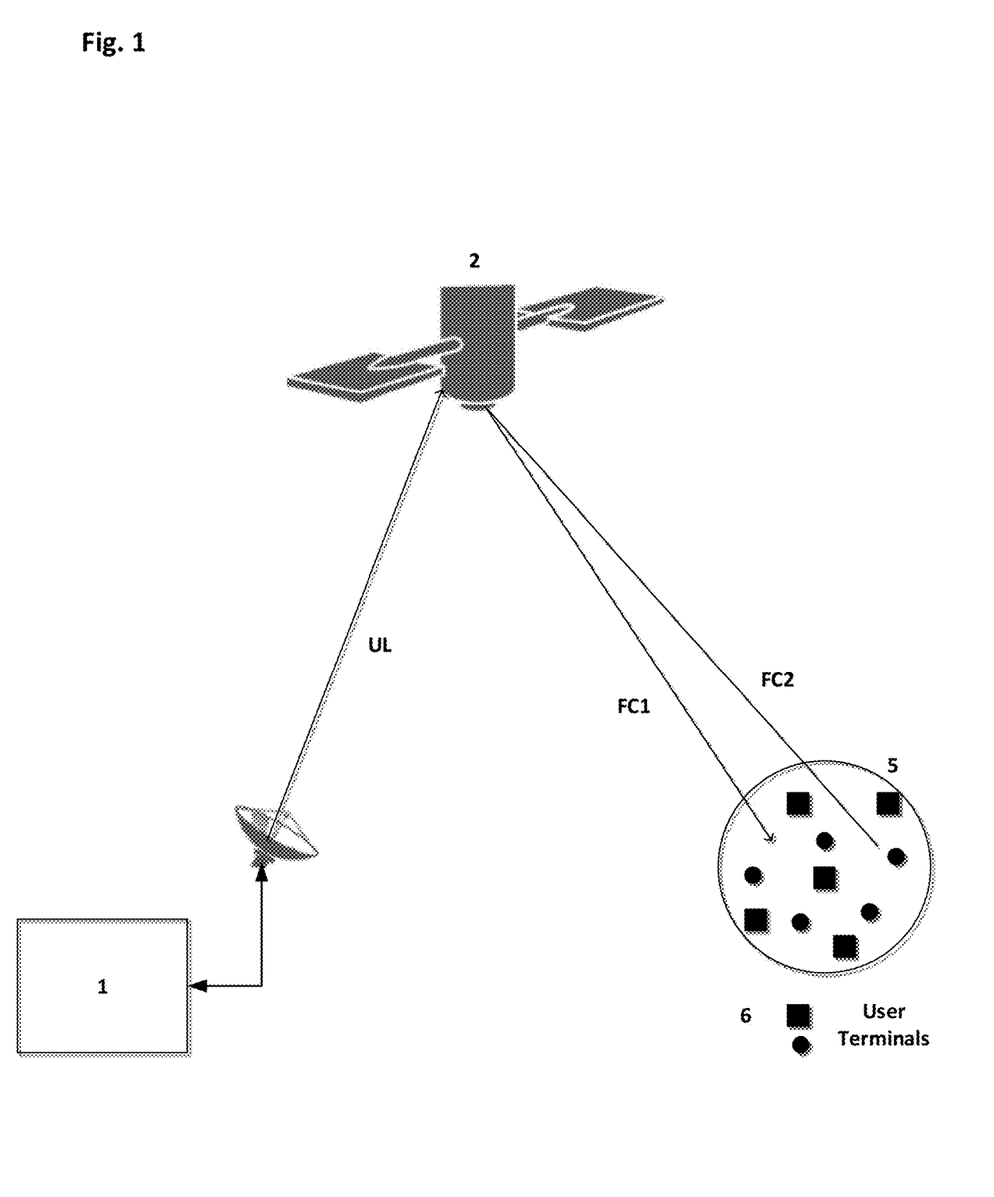
FIG. 1 is a diagram of a satellite communication system using a conventional ACM method.

FIG. 1 depicts a satellite communication system comprising a ground station 1 that transmits uplink signals UL to a satellite 2, which transmits corresponding downlink signals DL in one or more beams. A plurality of UTs (User Terminals) 6 in a beam 5 are served by two forward carriers FC1 and FC2. The forward carriers FC1, FC2 are shared between multiple user terminals 6. In a typical satellite communication network both the forward carriers FC1, FC2 will operate with a fixed EIRP (Effective Isotropic Radiated Power).

Consider an example where a UT 6 is making a voice over internet-protocol (VOIP), and is in an area where there is excellent signal strength. In a conventional ACM method the UT 6 will report its link conditions and the network will adapt the code rate and modulation so that the user can achieve maximum data rate. However, the UT 6 only requires a sufficient data rate to make a VOIP call, whereas the maximum data rate may only be required if the UT 6 is streaming real time data. Hence, the conventional approach to ACM may not give the optimum overall system performance.

SUMMARY OF THE INVENTION

Aspects of the present invention are defined by the accompanying claims. Embodiments of the invention include a method to optimise the system performance for given aggregate satellite power in the forward direction. This method may maximise total system throughput, rather than per user throughput in cases where the forward link is shared with a plurality of users.

Embodiments of the invention may use an algorithm that overcomes the conventional mismatch of requirements by adjusting the forward carrier EIRP.

The method may maintain equilibrium between ACM and optimisation of system capacity, for example by grouping of user terminals based on demand and/or geographic location, optimising the forward link power control such that the demand for each group is met, and balancing the total power available to optimise the link per user terminal group.

Optimising the forward link power may involve one or more of the following benefits. First, power distribution is no longer fixed so that user terminal groups with higher demand can be serviced with a higher power. Second, some user links may be operated with a lower power than in a conventional ACM method, which leads to reduction in interference, further improving system performance.

BRIEF DESCRIPTION OF THE DRAWINGS

Specific embodiments of the present invention will now be described with reference to the accompanying drawings, in which.

DETAILED DESCRIPTION OF EMBODIMENTS

Figure 2:
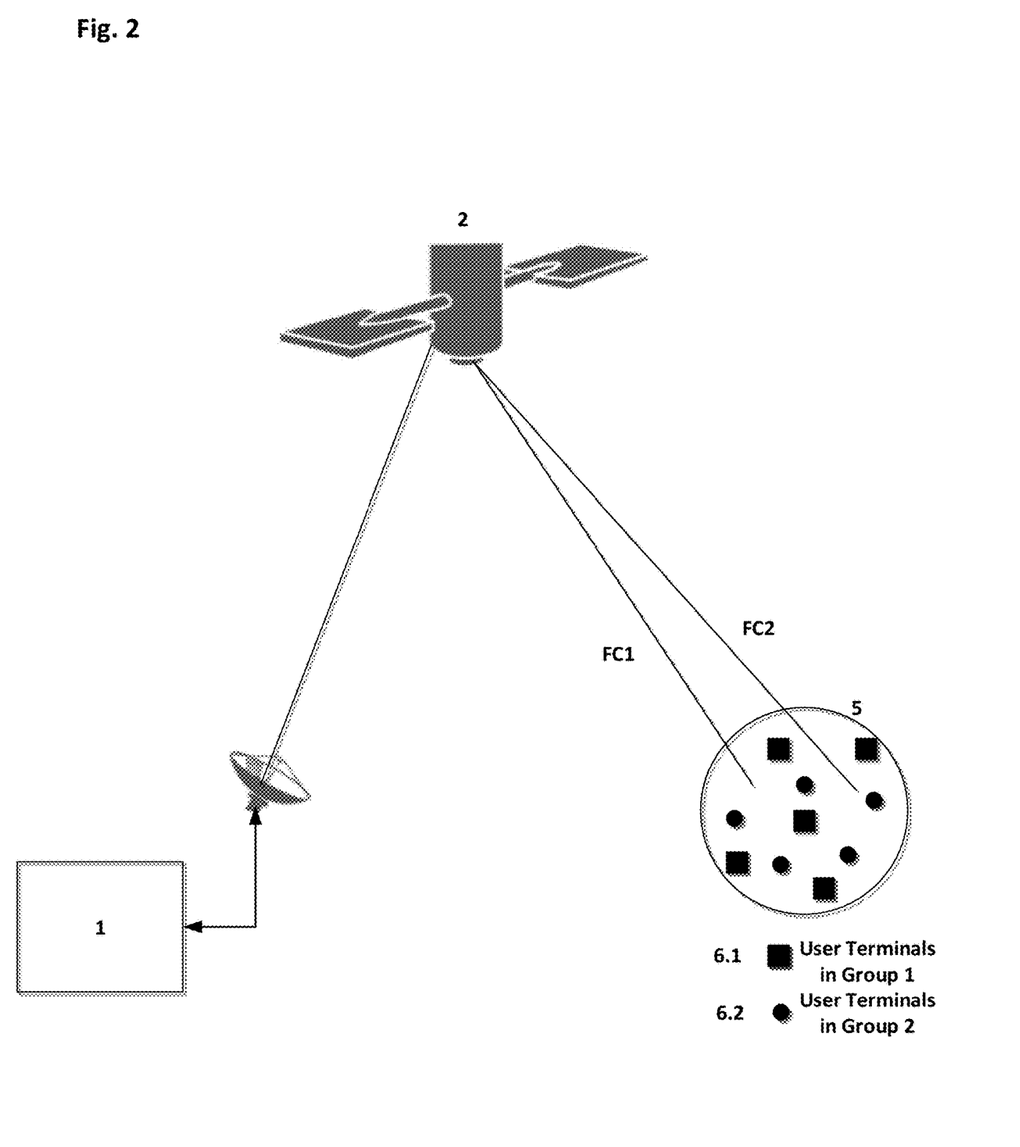
FIG. 2 is a diagram of a satellite communication system using an ACM method according to an embodiment of the invention.

Apparatus for use in an embodiment of the invention is shown in FIG. 2, in which similar parts to those in FIG. 1 carry the same reference numerals.

In the following discussion, the term 'carrier' may refer to a frequency channel having a predetermined bandwidth. The carrier may be shared between different UTs 6, for example using time slots in a TDMA system or spreading codes in a CDMA system.

The ground station 1 is arranged to maintain a record of demand from the UTs 6, for example from forward data queue length and/or demand requirements received from the UTs 6. The ground station 1 and/or the satellite 2 are able to adjust independently the power (e.g. EIRP) of each forward link carrier, for example for the forward carriers FC1, FC2.

Figure 3:
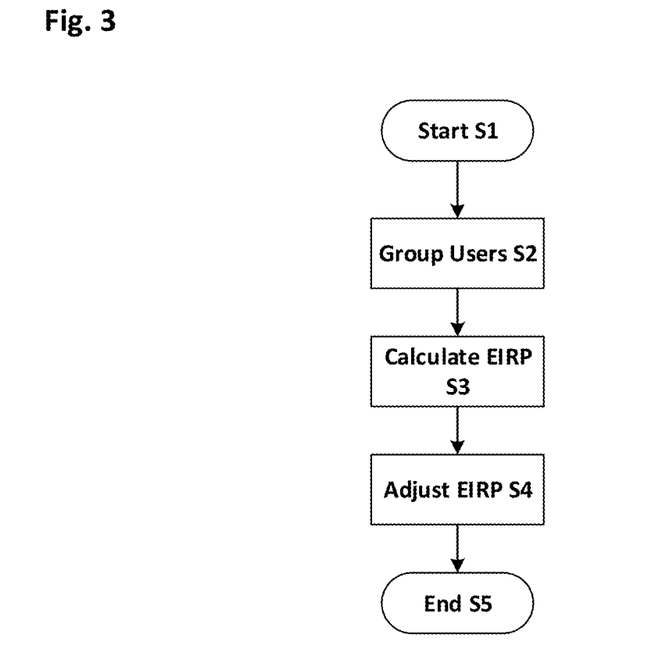
FIG. 3 is a flowchart of the ACM method in the embodiment.

The ground station periodically runs the algorithm shown in FIG. 3 to achieve optimised system capacity. Step S1 is a trigger event to start the method. The trigger can be a periodic time to wake up the ground station 1 to run the algorithm or an event such as addition of a new UT to the pool. The next step S2 is to group the UTs 6. The ground station 1 monitors the forward data queue and any pre-negotiated demand parameters for a particular UT to calculate the user terminal demand in the forward link. The ground station 1 then sorts the UTs 6 based on their traffic demand. The grouping is then done based on segregating the UTs into groups 6.1 and 6.2. There may be more than 2 groups, but preferably the number of groups is limited to a maximum predefined value.

In Step S3 the ground station 1 calculates the maximum EIRP needed within a group 6.1, 6.2 to satisfy the demands of every UT within that group.

In step S4 the power control function of the satellite 2 and/or the ground station 1 is used to adjust the EIRP for each forward link FC1, FC2, preferably subject to the following constraints.

Constraints

Let there be a maximum of θmax groups per beam 5 and let $up_{i\theta j}$ be the EIRP required to achieve a data rate $dr_{i\theta j}$ for $user_{i\theta j}$ where i=$i^{th}$ user and θj=$j^{th}$ user group.

Constraint 1: Total Beam Power $$bp_n = \sum_{j=0}^{\theta max} up_{\theta jmin} \leq \text{Max } EIRP \text{ per Beam 5}$$

Where $up_{\theta jmin}$ is the minimum power required in the $j^{th}$ user group to attain max($dr_{i\theta j}$).

Constraint 2: Aggregate EIRP $$power_{total} = \sum_{j=0}^{\theta max} bp_n \leq \text{Aggregate } EIRP \text{ for the satellite 2}$$

Algorithm

An example of the method of FIG. 3 will now be described as an algorithm.

Start S1:
    $init\_qos_i$=Read QoS per User
    $cno_{current}{}^i$=Read CNo for User "i"
    $capacity_{carrier}{}^i$=lookupdatarate(min ($cno_{current}{}^i$),ue_type)
    Look-up Table for Data-rate or carrier to Noise Ratio
    For each User Equipment Type the network will store a look up table mapping of the
    CNo and Datarate, for example as shown below.
    LookupDataRate(Look up value, UT Type)

| Type  | Sub Type | C/No  | Data Rate |
|-------|----------|-------|-----------|
| T5X4  | L8       | 51.5  | 110.7     |
| T5X4  | L7       | 52.6  | 135       |
| T5X4  | L6       | 53.75 | 162       |
| T5X4  | L5       | 54.72 | 190.8     |
| T5X4  | L4       | 55.77 | 220.5     |
| T5X4  | L3       | 56.83 | 250.2     |
| T5X16 | L2       | 57.35 | 270       |
| T5X16 | L1       | 58.43 | 315       |
| T5X16 | R        | 59.53 | 360       |
| T5X16 | H1       | 60.50 | 400.5     |
| T5X16 | H2       | 61.50 | 441       |
| T5X16 | H3       | 62.48 | 486       |
| T5X16 | H4       | 63.74 | 531       |
| T5X16 | H5       | 64.80 | 559.8     |
| T5X16 | H6       | 65.45 | 576       |
| T5X64 | H2       | 66.25 | 634.4     |
| T5X64 | H3       | 67.45 | 702       |
| T5X64 | H4       | 68.64 | 767       |
| T5X64 | H5       | 69.75 | 819       |
| T5X64 | H6       | 70.95 | 858       |

Where Type indicates the modulation type (the number after 'X' indicating the number of possible modulation symbols), and Sub Type indicates the FEC coding rate.

Group Users S2:

$cno_{required}{}^i$ = lookupdatarate($init\_qos_i$, $ue_{type}$)
    $deficit^i$ = $cno_{current}{}^i$ − $cno_{required}{}^i$
    $sort\_user_i$ = sorthightolow(deficit)
    Let $qos_i$ = $init\_qos_i$ of $sort\_user_i$
    $cum^i = \sum_{k=0}^{k=i} qos_i$
    n = 0
    Loop1:
      i = 0
      loop2:
        If($cum^i/capacity_{carrier}{}^n > 0$):
          $capacity_{group}{}^n = cum^i$
          $user_n{}^i = sort\_user_i$
          Increment i
        Else:
          Exit loop1
        End of If:
      End of loop2:
      total_carriers = n
      Increment n
    End of loop1:

Calculate EIRP S3:

$groupcno_{required}{}^n$ = lookupdatarate($capacity_{group}{}^n$, $ue_{type}$)
    $user_n{}^{least\_capable}$ = Read CNo for least capable UT in Group 'n'
    $cno\_deficit^n$ = $user_n{}^{least\_capable}$ − $groupcno_{required}{}^n$
    For all Carriers
    If $cno\_deficit^n = 0$ then don't do anything for this carrier -continued If $cno\_deficit^n > 0$:
    Add carrier to the list 'dec_power' as the carier power has to be decreased
Else:
    Add carrier to the list 'inc_power' as the carrier power has to be increased
Let D = number of carriers that have to be decreased in power, B be the total number of carriers that have to be increased in power and C be the total number of carriers that do not need any power change
Loop:
For each carrier (n = 1 to D) that needs power decrease
    $eirp^n$ = Read EIRP of carrier 'n'
    $user_n{}^{least\_capable}$ = Read CNo for least capable UE in Group 'n'
    $delta\_cno^n$ = $user_n{}^{least\_capable}$ − $groupcno_{required}{}^n$
    If $delta\_cno^n = 0$
      D = D − 1 Remove carrier for list of acrriers to be reduced
    Else:
      $power\_adjust^n = delta\_cno^n * \alpha$ where $\alpha$ is the convergence factor < 1
      Adjust_EIRP ($carrier^n$, −$power_{adjust}{}^n$)
For each carrier (n = 1 to B) that need power increase
    $eirp^n$ = Read EIRP of carrier 'n'

$$current\_power = \sum_{j=0}^{j=D+B+C} eirp^j$$

available_power = Max EIRP per Beam − current_power
    $power\_adjust^n$ = available_power/B
    Adjust_EIRP ($carrier^n$, $power_{adjust}{}^n$)
Decrement D
If D = 0 Exit Loop:
End of Loop:

Adjust EIRP S4:

Adjust_EIRP ($carrier^n$, $power_{adjust}{}^n$)
If $power_{adjust}{}^n$ < Satellite_power_Adjust_Threshold
    satellite_carrier_$eirp^n$ = satellite_carrier_$eirp^n$ + power_adjust$^n$
Else $power_{adjust}{}^n$ > Satellite_power_Adjust_Threshold
    satellite_carrier_$eirp^n$
      = satellite_carrier_$eirp^n$
      + Satellite_power_Adjust_Threshold
    power_adjust$^n$
      = power_adjust$^n$ − Satellite_power_Adjust_Threshold
    SAS_carrier_$eirp^n$ = SAS_carrier_$eirp^n$ + power_adjust$^n$ End S5:
    End Algorithm

Specific Use Example

Figure 4:
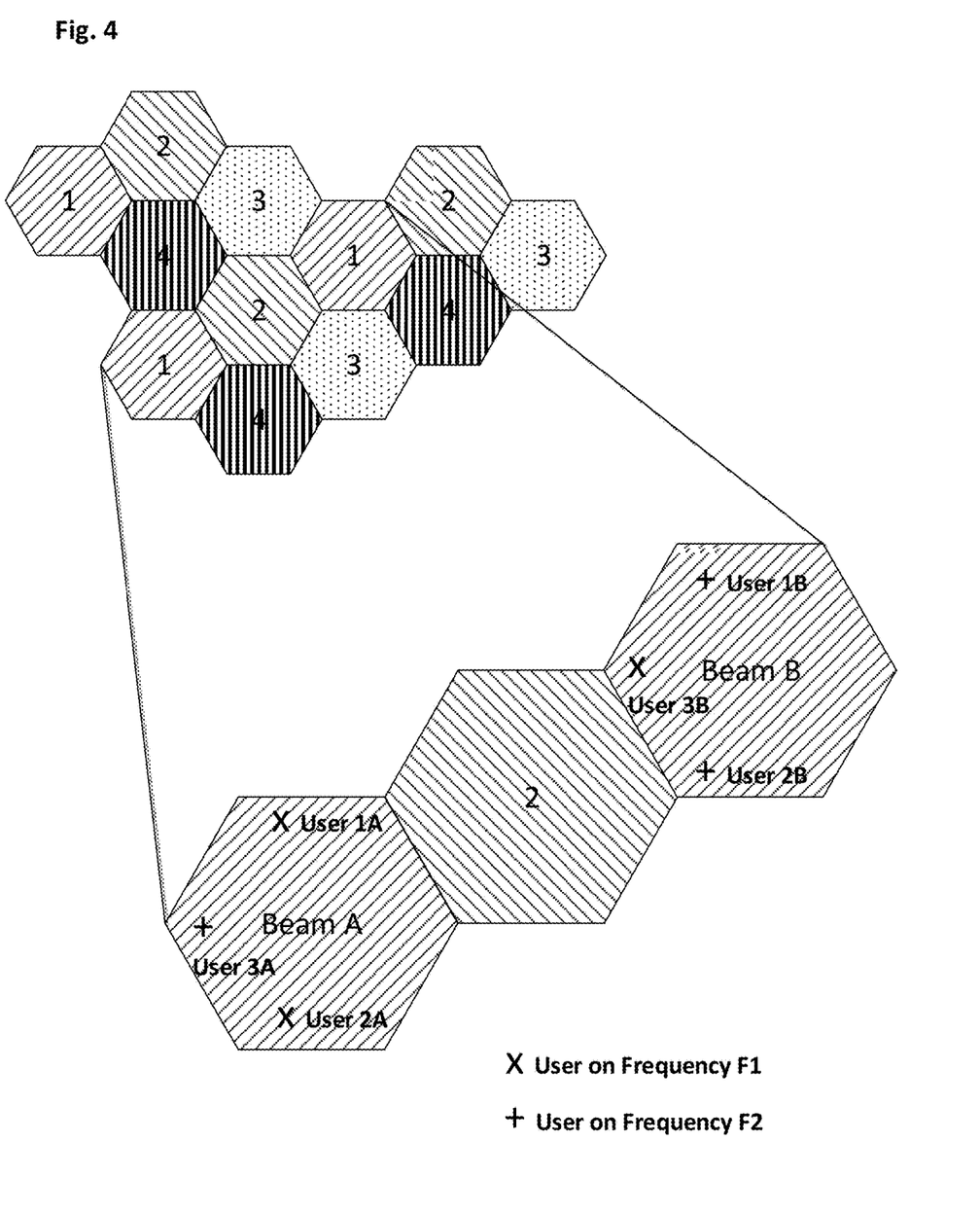
FIG. 4 is a diagram illustrating a specific use example of the embodiment.

A specific use example will now be described with reference to FIG. 4, which shows a beam pattern of a satellite network utilising a four-colour re-use scheme. In other words, carriers are assigned into four groups, with the groups being re-used between different beams having a minimum separation.

In an example, there are 3 users in each of Beam A and Beam B, with symmetric demands. For ease of link analysis, the beam isolation at all points is assumed to be the same. The user demands are as shown in Table 1 below.

TABLE 1

User Demands

| User | Service Type | Max QoS kbps requested |
|------|--------------|------------------------|
| User 1A and 1B | Voice Call | 24 |
| User 2A and 2B | Streaming | 128 |
| User 3A and 3B | High Quality Video | 858 |

The system will assign two full carriers F1 and F2 to users 3B and 3A respectively as they demand the maximum throughput that can be achieved by the system. Users 1A and 2A can be served on the same frequency as their maximum aggregate rate is 152 kbps which can be served with one carrier.

As the frequencies can be re-used, Users 1A and 1B are assigned frequency F1 and Users 2A and 2B are assigned frequency F2. In a conventional scenario the network will set both carriers with the same EIRP, for example 41.5 dBW. The conventional ACM allocates the best possible modulation and code rate. Table 2 details the link analysis for such a situation.

TABLE 2

Link analysis for all carriers with equal EIRP

| Beam | Frequency | Users | Max QoS kbps | EIRP dBW | CCI EIRP dBW | C/No dBHz | Code Rate | Throughput kbps |
|---|---|---|---|---|---|---|---|---|
| A | F1 | 1A-F1 | 24 | 41.5 | 41.5 | 64.5 | T5X16-H4 | 531 |
|   |    | 2A-F1 | 128 |      |      |      |          |     |
|   | F2 | 3A-F2 | 856 | 41.5 | 41.5 | 64.5 | T5X16-H4 | 531 |
| B | F2 | 1B-F2 | 24  | 41.5 | 41.5 | 64.5 | T5X16-H4 | 531 |
|   |    | 2B-F2 | 128 |      |      |      |          |     |
|   | F1 | 3B-F1 | 856 | 41.5 | 41.5 | 64.5 | T5X16-H4 | 531 |

The total power used by the two beams A and B is 47.5 dBW and the useful aggregate Data Rate is 1366 kbps.

In contrast, an implementation of the algorithm in an embodiment of the invention will now be described. The network has the information that Users 1A and 1B need a maximum of 24 kbps (IP voice) and Users 2A and 2B need a maximum of 128 kbps streaming rate i.e. an aggregate maximum of 152 kbps. Therefore the network can lower the power for those carriers. On the other hand users 3A and 3B need 858 kbps, which they cannot achieve. Therefore, the network will have to increase the power. The network optimises management of the co-channel interference and the required data rate, and adjusts the carrier powers as shown below, maintaining the same total power per beam.

TABLE 3

Link analysis for all carriers with optimised EIRP

| Beam | Frequency | Users | Max QoS kbps | EIRP dBW | CCI EIRP dBW | C/No dBHz | Code Rate | Throughput kbps |
|---|---|---|---|---|---|---|---|---|
| A | F1 | 1A-F1 | 24 | 31.5 | 44 | 54.4 | T5X4-L6 | 162 |
|   |    | 2A-F1 | 128 |     |    |      |         |     |
|   | F2 | 3A-F2 | 856 | 44  | 31.5 | 67.6 | T5X64-H3 | 702 |
| B | F2 | 1B-F2 | 24  | 31.5 | 44 | 54.4 | T5X4-L6 | 162 |
|   |    | 2B-F2 | 128 |     |    |      |         |     |
|   | F1 | 3B-F1 | 856 | 44  | 31.5 | 67.6 | T5X64-H3 | 702 |

The total power used in the total beams is almost the same as in the conventional case (the embodiment requires 0.25 dB less). The total data rate achieved is 1708 kbps i.e. 25% increase in total capacity for the two beams. In addition, the maximum per-user throughput goes up by 32% from 531 kbps to 702 kbps.

The application of the algorithm in the embodiment to the above example will now be described.
Start S1:
  Each User signals their Max QoS (Quality of Service):
1A, 1B Signals 24 kbps
2A, 2B signals 128 kbps
3A, 3B signals 858 kbps The RAN records the current CNo for each user. For simplicity in this example, they all have a CNo of 64.4 dBHz
Current max capacity of each current carrier=531 kps
Group Users S2:
  The required CNo is obtained from a look up table which is specific to a given satellite network.
  In this case for beam 1 the following are the required CNo
1A, 1B require 51.5 dBHz
2A, 2B require 52.6 dBHz
3A, 3B require 71 dBHz
The above steps are shown for Beam A; the same applies to Beam B.

Calculate Deficit
1A=64.4−51.5=12.9
2A=64.4−52.6=11.8
3A=64.4−71.0=−6.6
Sort User from Highest to Lowest
1A, 2A, 3A
Calculate Cumulative Max QoS
24, 152, 1010
Group based on max capacity of current carrier=531
Group 1=1A, 1B with aggregate data requirement of 152
Group 2=3A with aggregate data requirement of 852

Calculate EIRP S3:
  The required CNo for each group is obtained from a look up table which is specific to a given satellite network.
Group 1=53.75
Group 2=71
Calculate deficit CNo
Group 1=64.4−53.75=10.75
Group 2=64.4−71=−6.6
Let F1 be the frequency for Group 1 and F2 for Group 2
Therefore, power of F1 has to be reduced whereas the power of F2 has to be increased.

Applying the EIRP control algorithm of the embodiment:

TABLE 4

Example 1: alpha = 0.5 slower convergence

| EIRP F2 dBW | EIRP F1 dBW | Current CNo dBHz | DeltaCNo dB | Delta * 0.5 dB | Power adjust dB | Total Power dBW |
|---|---|---|---|---|---|---|
| 41.5 | 41.5 | 64.5 | 10.75 | 5.4 | 5.0 | 44.5 |
| 44 | 36.5 | 59.13 | 5.38 | 2.7 | 3.0 | 44.5 |
| 44 | 33.5 | 56.54 | 2.79 | 1.4 | 1.0 | 44.5 |
| 44 | 32.5 | 55.39 | 1.64 | 0.8 | 1.0 | 44.5 |
| 44 | 31.5 | 54.43 | 0.68 | 0.3 | 0.0 | 44.5 |

TABLE 5

Example 2: alpha = 0.8 fast convergence

| EIRP F2 dBW | EIRP F1 dBW | Current CNo dBHz | DeltaCNo dB | Delta * 0.8 dB | Power adjust dB | Total Power dBW |
|---|---|---|---|---|---|---|
| 41.5 | 41.5 | 64.5 | 10.75 | 8.6 | 9.0 | 44.5 |
| 44 | 32.5 | 55.39 | 1.64 | 1.1 | 1.0 | 44.5 |
| 44 | 31.5 | 54.43 | 0.68 | 0.5 | 0.0 | 44.5 |

Alternative Embodiments

Alternative embodiments of the invention may be envisaged, which may nevertheless fall within the scope of the accompanying claims.

What is claimed is:

1. A method of forward link power control in a wireless communication system, the method comprising:
   a. for each of a plurality of user terminals, determining a respective forward link demand of that user terminal;
   b. grouping the plurality of user terminals into a plurality of groups according to said determined forward link demands of each of the user terminals, wherein at least one of the groups comprises more than one of the user terminals;
   c. for each said group, determining a corresponding forward link power level required to satisfy an aggregate of said determined forward link demands of each of the user terminals within that group, and assigning one or more forward link carriers to the group, with the corresponding forward link power level.

2. The method of claim 1, wherein grouping the user terminals includes sorting the user terminals by said determined forward link demands of each of the user terminals and segregating the user terminals into the plurality of groups.

3. The method of claim 1, wherein said forward link demands are determined from corresponding forward data queue lengths for each of said terminals.

4. The method of claim 1, wherein said forward link demands are determined from corresponding demand requirements received from each of the user terminals.

5. The method of claim 1, wherein at least one of the groups comprises a single said user terminal having a higher determined forward link demand than other ones of the user terminals.

6. The method claim 1, wherein the user terminals are additionally grouped by geographic location.

7. The method of claim 1, wherein the wireless communication system is a satellite communications system.

8. The method of claim 7, wherein the user terminals are arranged in a plurality of beams in which the carriers may be re-used subject to a minimum re-use distance.

9. The method of claim 1, wherein the number of groups is limited to a predetermined maximum.

10. The method of claim 1, wherein the forward link power levels are constrained by a maximum aggregate power level.

11. The method of claim 1, wherein the power level comprises an EIRP.

12. The method of claim 1, wherein the carriers comprise frequency channels.

13. The method of claim 1, including assigning a corresponding coding and/or modulation rate to each of the forward link carriers.

14. The method of claim 1, including transmitting to the user terminals using the forward link carriers with the corresponding power levels.

15. The method of claim 1, wherein each said group is assigned to a corresponding one of the forward link carriers.

16. The method of claim 8, wherein a plurality of said groups of user terminals are located within the same one of said beams.

17. A wireless communication system comprising:
   a plurality of user terminals; and
   a transmitter arranged to transmit wireless signals to the plurality of user terminals over a forward link;
   wherein a respective forward link demand is determined for each of the user terminals, and the user terminals are grouped into a plurality of groups according to said determined forward link demands of each of the user terminals, wherein at least one of the groups comprises more than one of the user terminals;
   for each said group, a corresponding forward link power level required to satisfy an aggregate of said determined forward link demands of each of the user terminals within that group is determined, and one or more forward link carriers are assigned to the group, with the corresponding forward link power level.

18. A non-transient computer readable medium containing program instructions for causing a computer to:
   a. for each of a plurality of user terminals, determine a forward link demand of that user terminal;
   b. group the plurality of wireless user terminals into a plurality of groups according to said determined forward link demands of each of the user terminals, wherein at least one of the groups comprises more than one of the user terminals;
   c. for each said group, determine a corresponding forward link power level required to satisfy an aggregate of said determined forward link demands of each of the user terminals within that group, and assign one or more forward link carriers to the group, with the corresponding forward link power level.

* * * * *